United States Patent [19]
Vogeley, Jr. et al.

[11] Patent Number: 5,937,080
[45] Date of Patent: Aug. 10, 1999

[54] COMPUTER CONTROLLED METHOD AND APPARATUS FOR MEAT SLABBING

[75] Inventors: Arthur W. Vogeley, Jr., Seattle; Bret J. Larreau, Carnation, both of Wash.

[73] Assignee: Design Systems, Inc., Redmond, Wash.

[21] Appl. No.: 08/788,681

[22] Filed: Jan. 24, 1997

[51] Int. Cl.⁶ .............................. G06K 9/00; G06F 19/00
[52] U.S. Cl. .............................. 382/110; 382/143; 83/42; 83/75; 83/77
[58] Field of Search .................... 382/110, 143; 83/77, 75, 42, 364, 932; 209/3; 250/458.1

[56] References Cited

U.S. PATENT DOCUMENTS

| | | | |
|---|---|---|---|
| 3,916,484 | 11/1975 | Kennedy | 17/52 |
| 3,930,991 | 1/1976 | Gillespie | 209/3 |
| 4,118,777 | 10/1978 | Wallace | 364/475 |
| 4,194,267 | 3/1980 | Johnson et al. | 17/52 |
| 4,246,837 | 1/1981 | Chenery | 99/486 |
| 4,557,019 | 12/1985 | Van Devanter et al. | 17/52 |
| 4,601,083 | 7/1986 | Soji et al. | 17/54 |
| 4,631,413 | 12/1986 | Jensen et al. | 250/458.1 |
| 4,756,058 | 7/1988 | Göllnitz et al. | 17/54 |
| 5,194,036 | 3/1993 | Chevalier et al. | 452/198 |
| 5,267,168 | 11/1993 | Antonissen et al. | 382/110 |
| 5,481,466 | 1/1996 | Carey | 83/42 |

*Primary Examiner*—Jose L. Couso
*Assistant Examiner*—Matthew C. Bella
*Attorney, Agent, or Firm*—Christensen O'Connor Johnson & Kindness PLLC

[57] ABSTRACT

A computer controlled method and apparatus for meat slabbing according to updated information from the meat product and/or the slab cut from the meat product. Such information may include the weight and fat content of the cut slab. This information may be used to reoptimize the slabbing of the meat product and also may be used to further process the cut slab. Such processing might include marking the location of fat to be trimmed, trimming the fat from the slab, portioning the slab and sorting the slab in accordance with preselected parameters.

74 Claims, 7 Drawing Sheets

COMPUTER CONTROLLED METHOD AND APPARATUS FOR MEAT SLABBING

FIELD OF THE INVENTION

This invention relates generally to meat slabbing, and more particularly, to methods and apparatus for updating the cutting of meat according to in-process information.

BACKGROUND OF THE INVENTION

The meat butchering industry is continually searching for systems and methods that optimize the meat cutting process. Extracting the greatest monetary value from a carcass or subprimal is a major goal of the industry. Various methods and devices exist with the recent integration of computer technology into the cutting process proving to be a most efficient and effective tool.

One form of computer integration is shown in U.S. Pat. No. 4,194,267, which discloses a computer controlled method for severing the heads off of fish in an assembly process. A video camera records the image of each fish passing through the process and a processor determines from the recorded video image the optimum cutting path of head removal. The apparatus of the '267 patent is effective for head removal of fish but not very practical for multiple cuts required for meat carcasses.

U.S. Pat. No. 4,118,777 discloses another method for utilizing computer technology. This patent discloses automatic positioning of a saw to produce the most economical cuts on a specific carcass according to a preselected computer solution. The computer control also automatically directs a light or shadow onto the carcass aiding the butcher, thus producing an economical cut.

The prior art fails to address the issue that no two carcasses are identical, and thus fails to understand what is required for optimizing the cut of each uniquely shaped carcass. Also, the prior art described above fails to address the issue of efficient removal of fat from a carcass. Further, the prior art does not provide an apparatus to cut meat accurately in accordance with desired parameters at a speed fast enough for modern production line requirements.

SUMMARY OF THE INVENTION

The present invention provides methods and apparatuses for cutting slabs from a meat product in accordance with one or more desired physical parameters. Information from the remaining meat product and/or cut slab is ascertained and used to adjust the cutting for the next slab according to the determined information and the desired cutting parameters. The apparatus repeats this cutting, information gathering and cut adjustment process until cutting of the meat product is complete.

In accordance with a more particular aspect of this invention, prior to any slabs being cut, the apparatus weighs the meat product and generates a weight-to-length table according to the weight of the meat product and a predetermined length value that corresponds to the type of meat product. A slab of meat is cut from the meat product by a cutting device in accordance with the weight-to-length table and the one or more desired physical parameters. The remaining meat product and/or the cut slab is weighed and such weight value(s) is used to update the weight-to-length table. Also, the position of the cutting device relative to the meat product is either confirmed or adjusted based on the updated weight volume. The cutting, measuring and updating of the table is repeated until the meat product is fully cut.

Thus, every cut of a slab of meat after the first slab is cut is based on an updated weight-to-length table, therefore improving the cut strategy of the entire meat product.

In accordance with still other aspects of the present invention, the physical parameters with respect to which the meat product is cut include the thickness of the cut slab, the weight of the cut slab, and maximum allowable fat about the perimeter of the slab, etc.

In accordance with a further aspect of the present invention, the cut slab cross section is scanned optically or by other technique and the information determined thereby is used to adjust the cutting of the meat product, accept or reject the cut slab or other purpose.

In accordance with a related more specific aspect of the present invention, the information determined from scanning the cut slab is used to update the weight-to-length table.

In accordance with yet other aspects of this invention, prior to cutting, a fat profile table is generated in accordance with a predetermined fat proportion value that corresponds to the selected profile model. A slab is cut from the meat product in accordance with the weight-to-length table and the fat profile table. The cross section of the cut slab is scanned for fat content and the scan information is used to update the fat profile table. The process is repeated in a manner similar to that in the preferred embodiment noted above.

In accordance with still further aspects of this invention, the scanning of cut slabs is performed by a video camera.

In accordance with still further aspects of the present invention, the scan information is also used to direct the path of a cutting device to trim the fat in accordance with applicable criteria, e.g., maximum thickness of the fat.

As will be readily appreciated from the foregoing summary, the invention provides a new and improved method and apparatus for optimizing the cutting of meat products.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
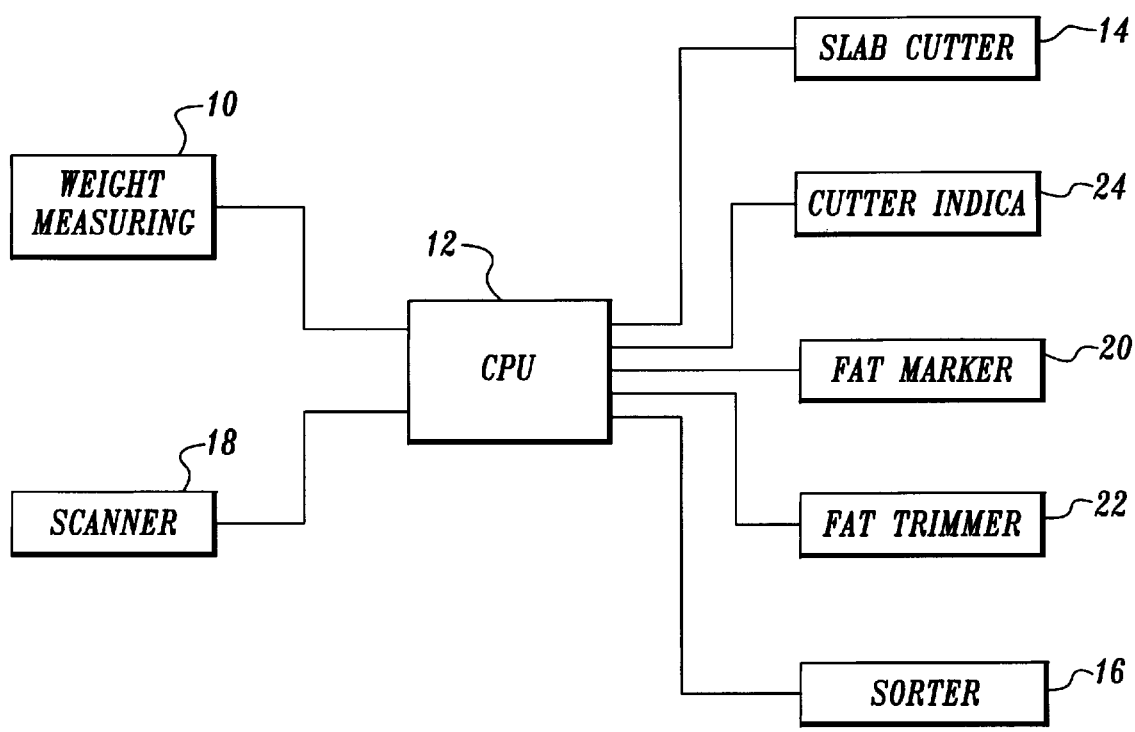
FIG. 1 is a functional block diagram illustrating the components of the present invention.

FIG. 1 is a block diagram of the components of the present invention. Weight information from a weight measuring device 10 pertaining to the meat product to be cut or being cut and/or pertaining to slabs cut from the meat product are transmitted to the computer processing unit (CPU) 12. This information is analyzed by the CPU and a control signal is generated for transmitting to one of a variety of operational stations, such as to a slab cutter 14 or sorter 16. CPU 12 consists of a full control system including a processor, memory devices, input and output interfaces, electronic signal generators, etc.

A scanner 18 may be employed to collect additional data with respect to slabs cut from the meat product. This data is transmitted to the CPU 12. The CPU 12 uses this information to generate control signals for operational stations including slab cutter 14 (which may be automated, semi-automated or manually operated) or an automated sorter 16 to sort slabs according to predetermined physical parameters. Also, this information may be sent to other operational stations, such as a fat trimmer 22, a fat marker 20 for marking a cutting path for a knife or other device for trimming the fat, or a cutter indicia 24 for providing visual and/or audible indicia or dimensions for placement of a knife or other type of cutter device used to cut the next slab. In the foregoing manner, information determined from the meat product being cut as well as slabs cut therefrom are not only fed back to adjust the strategy for cutting the meat product, but also fed forward to perform further operations on the slab already cut.

Figure 2:
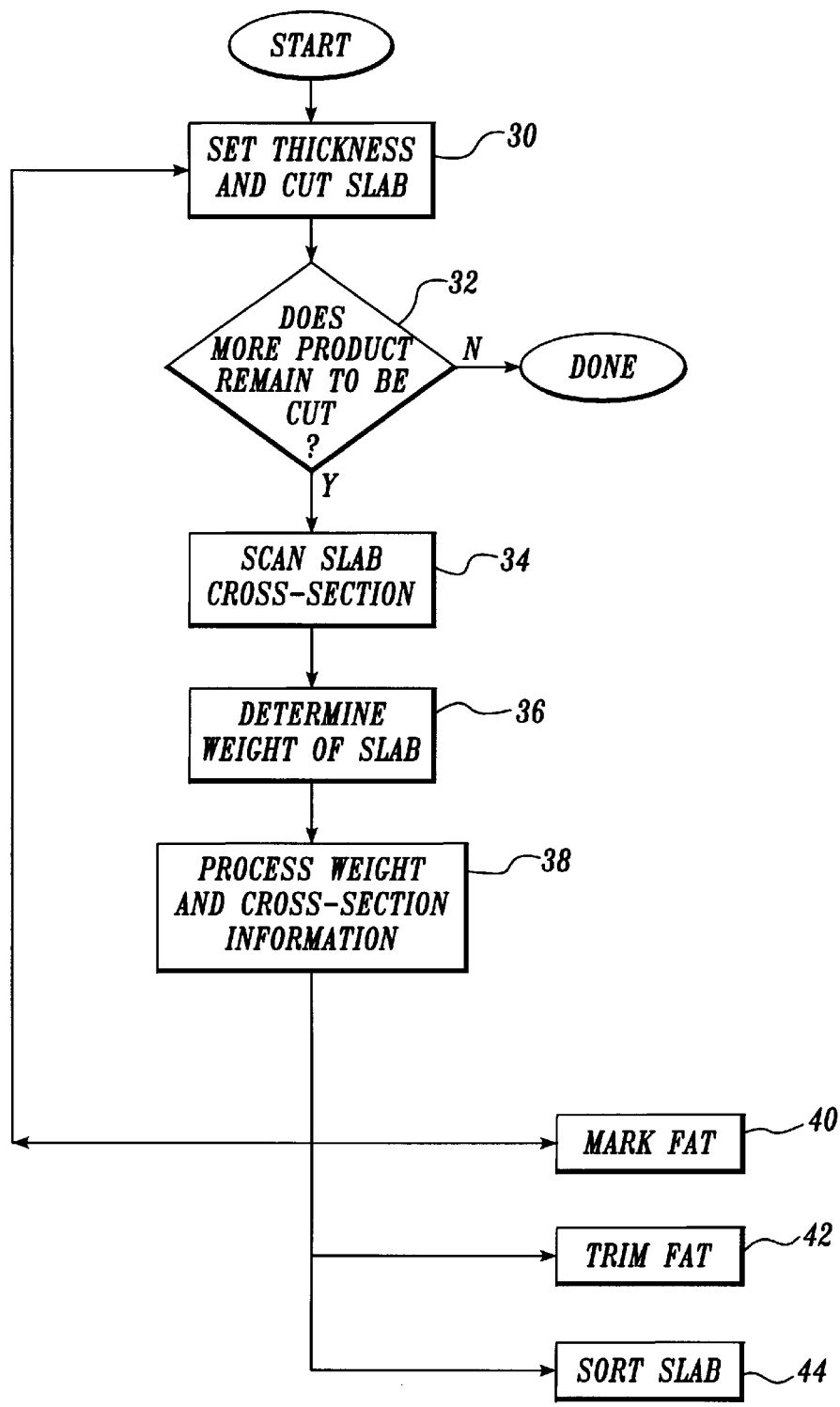
FIG. 2 is a flow diagram of an embodiment of the present invention.

FIG. 2 illustrates a meat slabbing method of a first embodiment. The method illustrated produces slabs of desired physical criteria (e.g., slab weight/slab thickness/fat thickness). First, the thickness of the slab is set and a slab is cut from the subprimal (block 30). The process is complete if no more product remains to be cut (block 32), otherwise, the cross-section of the most recently cut slab is scanned (block 34). The slab weight is then determined (block 36). The slab weight can be determined in a number of ways: (1) the weight of a subprimal can be compared before and after a cut is performed; (2) the weight of the cut slab can be directly measured, for instance, by a scale; or, (3) the weight of the cut slab can be ascertained by analyzing the slab lean-to-fat and volume information determined from the cross section scan. Before the next slab is cut, the weight and cross-sectional information is processed (block 38) against a predefined desired physical parameters stored in the memory of the CPU 12. The processed information is fed back to the cutting step (block 30) for adjusting the thickness according to the processed information.

Information gathered from the scanning process can also be used to analyze the presence of fat on the slab, including the location and thickness of the typical perimeter fat layer. This information can be processed (block 38) to be used to adjust the cutting thickness. This information can also be fed forward to mark the fat to be trimmed from the cut slab (block 40), which trimming can then be carried out by hand. Alternatively, the processed information may be used directly in trimming the fat (block 42), for instance, by controlling a cutting device, such as a high speed water jet cutter. Further alternatively, the processed information can be used to control the operation of an automated sorting device (block 44) to sort slabs in accordance with predetermined desired physical parameters, for instance, sorting slabs into a first group that meets such parameters and the second group that does not meet such parameters.

Figure 3:
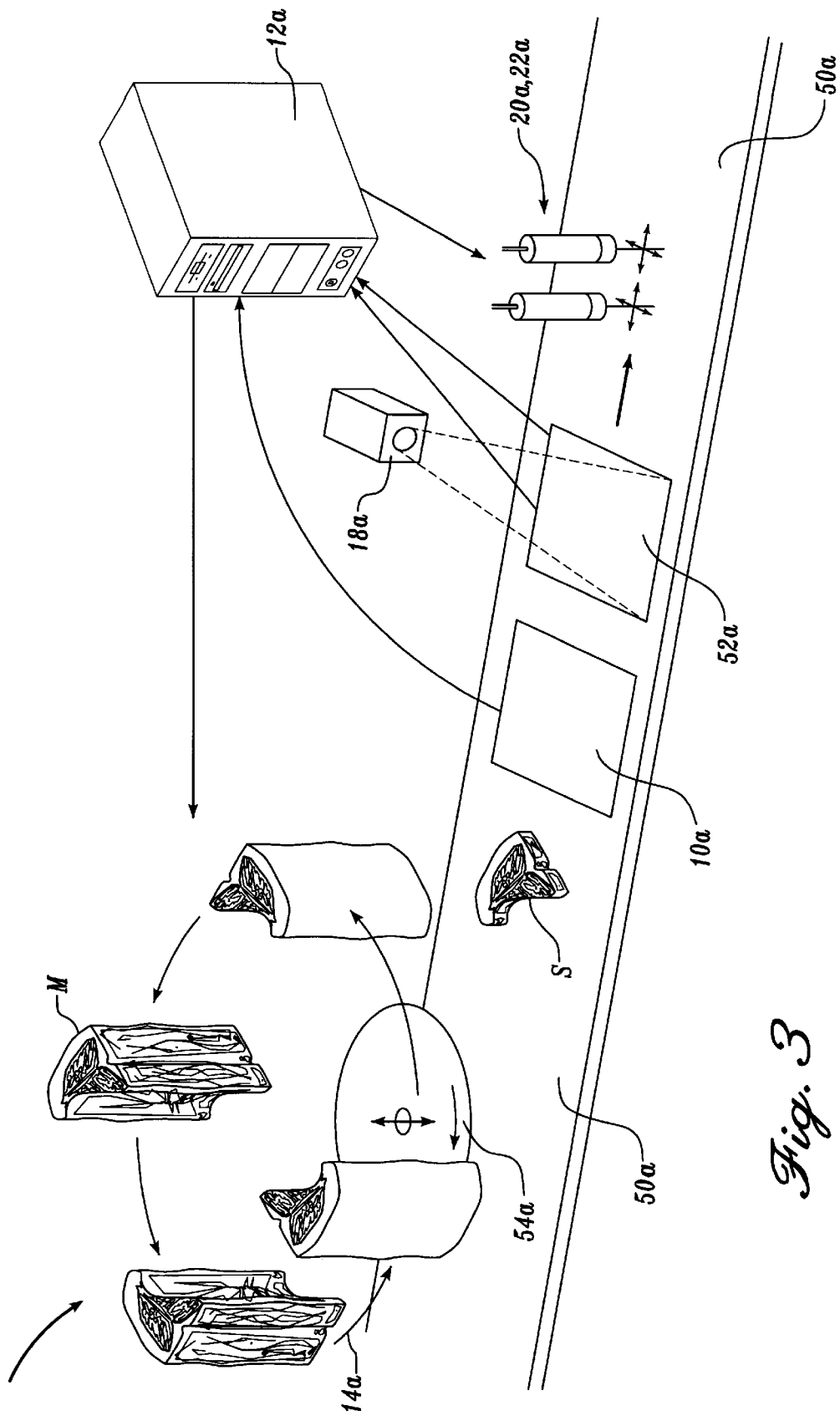
FIGS. 3–5 are pictorial, schematic views of various meat slabbing apparatus of the present invention.
Figure 4:
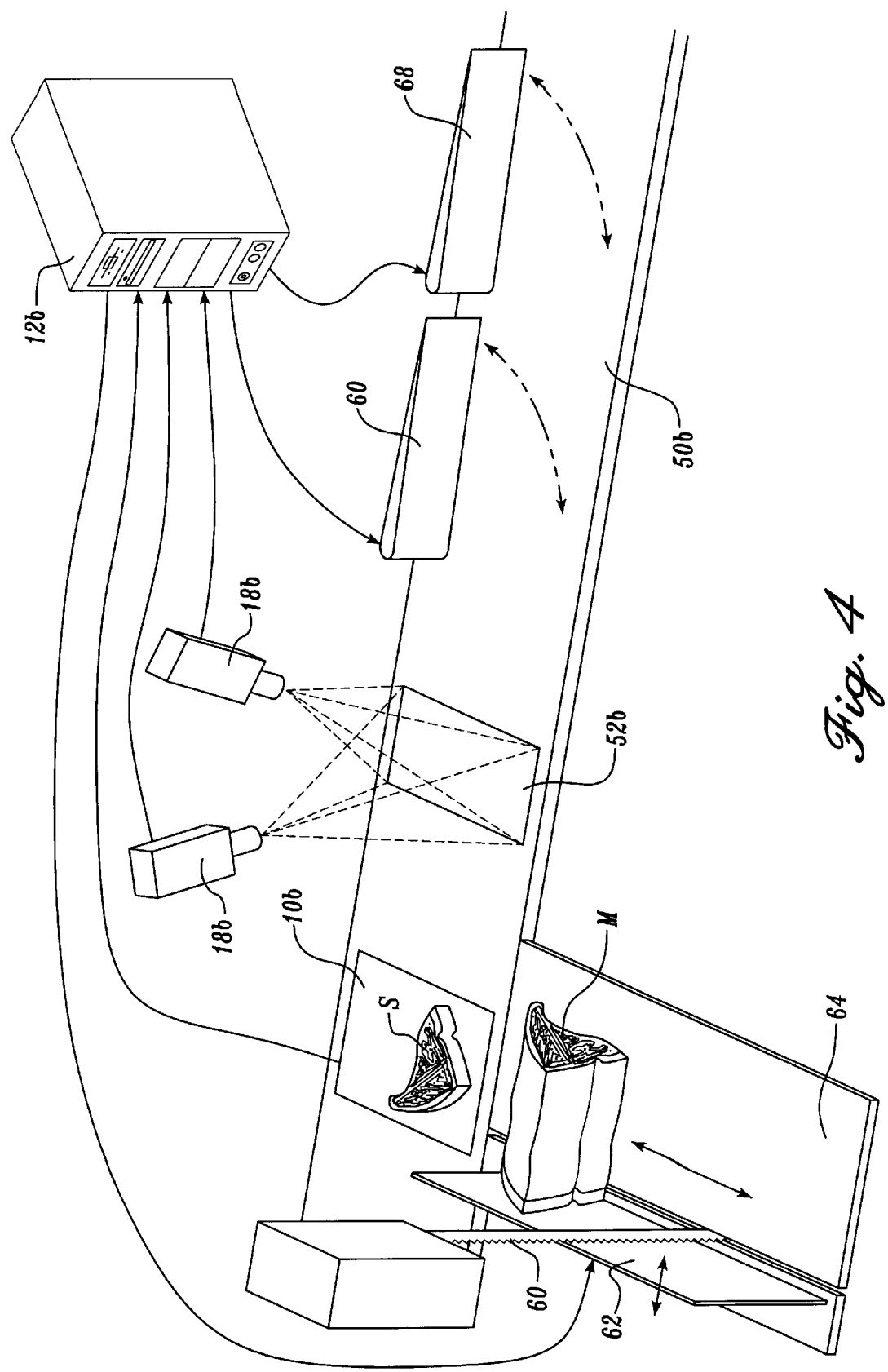
Figure 5:
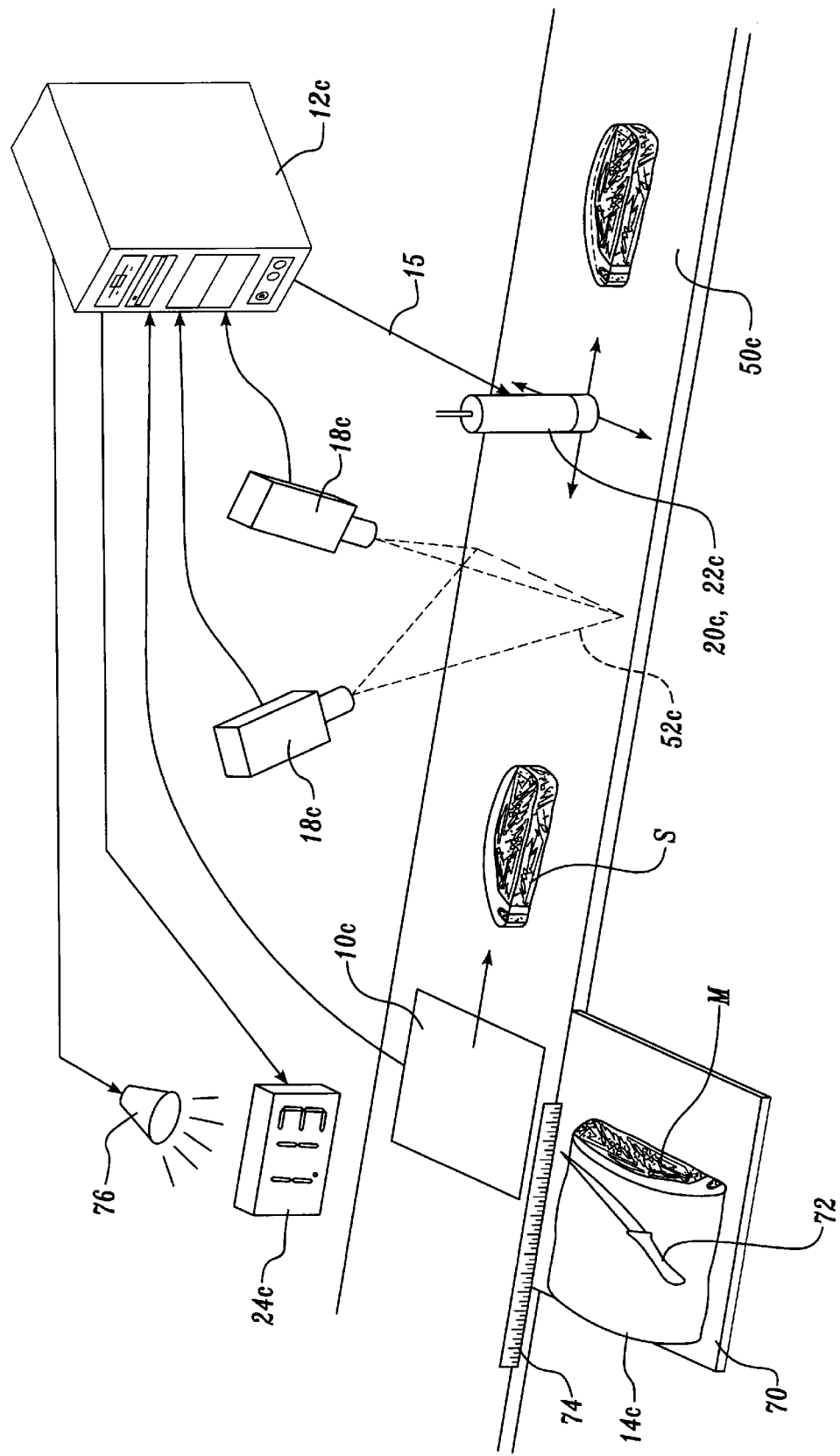

FIGS. 3–5 schematically depict various meat slabbing apparatus for performing the method illustrated in FIG. 2. In FIG. 3, the meat slabbing apparatus includes a powered slab cutter 14a and a scanner 18a, both tied to a processor CPU 12a. The slab cutter 14a is positioned at a first end of a conveyor 50a on which cut slabs from a subprimal M are carried. Scanner 18a is located downstream of the slab cutter 14a to scan slabs as they pass by scanning area 52a. A fat trimmer 22a or marker 20a is located downstream of scanner 18a. CPU 12a controls the operation of the foregoing components. CPU 12a includes a processor and a memory, not shown, and may include a user interface to allow an operator to interact with the control of the system. The scanner 18a may be a typical dual camera set-up producing stereoscopic image signals or other type of scanner. It can be appreciated to one of ordinary skill in the art that an image processor is used to analyze the produced stereoscopic image signals or signals from similar imaging devices.

The slab cutter 14a includes a cutting device 54a to cut slabs S from subprimal (meat product) M. More specifically, as shown in FIG. 3, slab cutter 14a (controlled by CPU 12a) is of a continuous feed type having a circular cutting device 54a. The cutter 14a also includes a system, not shown, for supporting the subprimal M in position to address the cutting device. AEW International Limited's model APC slicer is an example of a commercially available slab cutter suitable for the purpose of the invention as shown in FIG. 3.

After a slab S is cut, the slab S travels on conveyor 50a. Conveyor 50a carries the slab S past scanner 18a to trimmer 22a or fat markers 20a. Scanner 18a scans the slab S as the slab travels along conveyor 50a towards trimmer 22a or marker 20a. CPU 12a is coupled to scanner 18a and slab cutter 14a and is also coupled to trimmer 22a or marker 20a. The information from scanner 18a is fed to CPU 12a. CPU 12a analyzes the received scanned image and any desired physical parameters stored in memory, and determines from the analysis the optimum strategy for cutting for the next slab to be cut within slab cutter 14a. The CPU also transmits control signals to the trimmer 22a or marker 20a to control the operation of these devices.

The scanner 18a may be employed not only to locate, measure and trim the fat on slab S, but also to determine the weight of the cut slab. As will be appreciated, this is accomplished by determining the volume of the cut slab and the proportion of such volume composed of lean and composed of fat. For a particular type of meat, known density values for lean and fat are utilized in calculating the weight of the cut slab. This weight information is used by the CPU to control the operation of slab cutter 14a. For instance, if slabs S are to cut to a uniform weight and have a maximum fat layer about its outer perimeter, the information from the CPU is used to adjust the position of the slab cutter 14a relative to the subprimal M so such criteria is met.

Rather than being positioned along conveyors 50a, the scanner 18a may be located at slab cutter 14a to scan the bottom of subprimal M.

As an alternative to using scanning information to determine the weight of the cut slab, a weight measuring device 10a may be utilized to directly measure the weight of the cut slab. Such device can be composed of a load cell 10a incorporated within conveyor 50a. Alternatively, the weighing device may be positioned at the cutter 14a to weigh the subprimal M before and after a slab is cut to thereby determine the weight of the cut slab. The information from weighing device 10a is transmitted to CPU 12a for use as described above.

Next referring to FIG. 4, the slabbing apparatus includes a slab cutter 14b composed of a vertical blade 60, which may be reciprocal, such as a hacksaw blade or continuous, for instance, a bandsaw blade. A powered fence 62 is located on one side of blade 60. Ideally, the position of fence 62 vis a vis blade 60 is controlled by CPU 12b. The slab cutter 14b further includes a powered reciprocating table 64 for supporting the subprimal M being cut by blade 60. The table 64 pushes the subprimal through the cutting blade 60 to cut slabs S which are thereupon transferred to a conveyor 50b.

The table 64 then returns to its starting position to reindex the subprimal relative to the blade 60 to get ready for the next cut.

Conveyor 50b carries the cut slabs pass a weight measuring load cell 10b (if utilized) and then pass a scanner 18b. The information from load cell 10b and scanner 18b is transmitted to CPU 12b for use in not only adjusting the location of fence 62 for making the next cut of primal M, but also to operate actuating arms 66 and 68 which route or direct the slab S to bins or underlying or transverse conveyors (not shown) depending on the information determined by load cell 10a and/or scanner 18a. For example, if slab S meets the desired criteria (acceptable weight, acceptable thickness, acceptable fat content, etc.), arm 66 may be actuated to direct the slab S for further processing (e.g., fat trimming), packaging, etc. However, if the slab S does not meet the desired criteria, arm 68 could direct the slab to other locations, for instance, to correct the deficiency, reprocess the slab for other uses, etc.

Rather than employing a load cell lob, a weighing device can be incorporated into table 64. In this situation, the weight of slab S is determined by comparing the weight of subprimal M before and after the slab S has been cut. Also, as described above with respect to FIG. 3, rather than using a load cell 10 (whether incorporated into the construction of the conveyor or the construction of the table 64), the weight of the slab S can be determined by information gained from the scanning of the slab by scanner 18b.

Next referring to FIG. 5, slabber 14c includes a cutting surface 70 on which is placed subprimal M which is manually cut by knife 72. A ruler or scale 74 may be employed so that the operator of knife 72 is aware of the thickness of the slab being cut. After a slab S is cut from subprimal M, the slab is placed on conveyor 50c for travel past a weighing station 10c (if utilized) then passed a scanning station 52c. At station 52c, the scanner 18c scans the slab to determine the volume of the slab, its fat content and fat location, which information is then transmitted to CPU 12c, in the manner described above. As also described above, this information is processed by CPU to determine the weight of the slab, its lean content, its fat content and location, etc. This information is then used to reoptimize the cutting strategy for subprimal M and then communicate to the operator of knife 72 the next thickness to be cut from the subprimal M. This output can be visually through display 24c and/or audibly through a speaker 76. Using the ruler 74 as a guide, the operator can then cut the subprimal M in accordance with the thickness dictated by the CPU 12c.

Rather than scanning slabs moving along conveyor 50c, scanner 18c may be positioned to scan the end of subprimal M being cut, i.e., the right hand side of subprimal shown in FIG. 5. The information from the scanner 18c would thus be available to CPU at an earlier time than if the scanner were located further down stream.

The CPU may also output command signals to a marker 20c to mark a line, a series of dots, along which slab S to be cut. As discussed above, typically the mark from marker 20c is to visually show where the fat is to be trimmed from the slab S. Rather than controlling the marker 20c, the control signals from the CPU 12c may be used to control the operation of a cutting device 22c to directly trim the fat or other undesired content from slab S.

Figure 6:
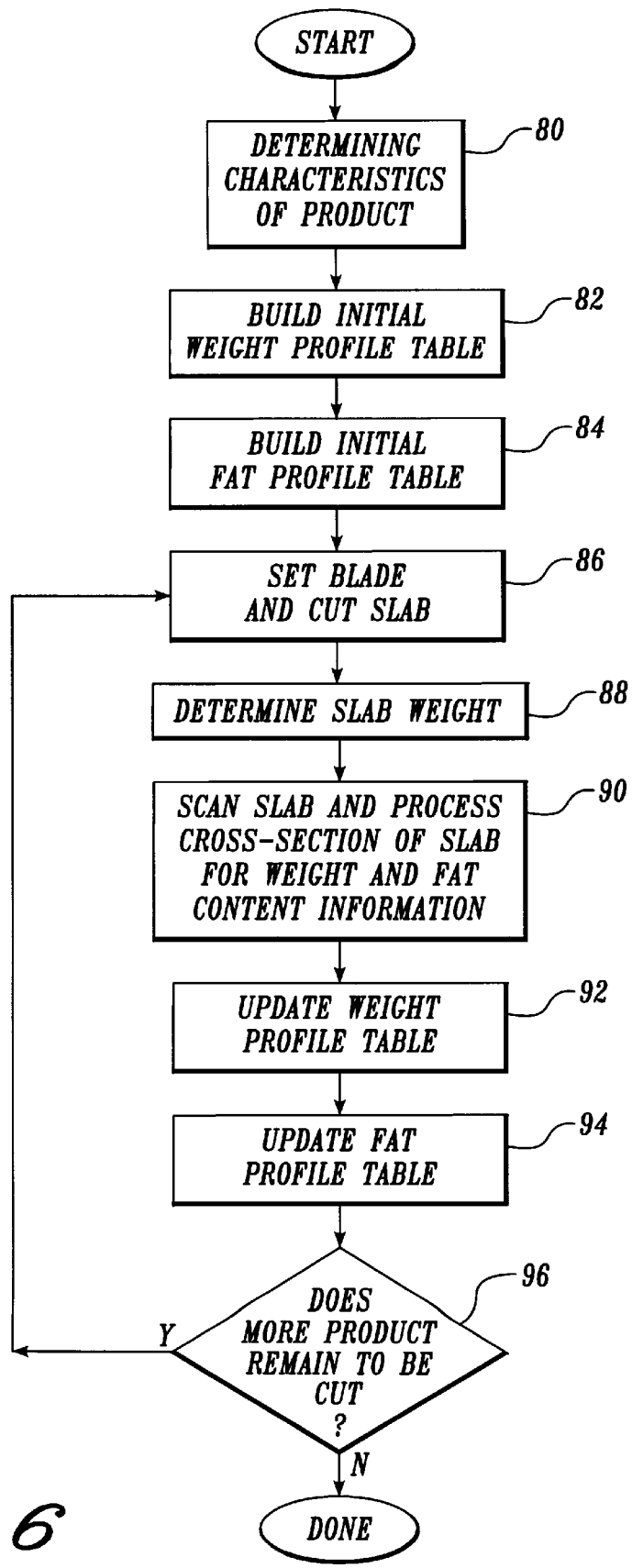
FIG. 6 is a flow diagram of another embodiment of the present invention.

FIG. 6 illustrates a method performed by another preferred embodiment of the present invention. This embodiment also produces optimal cutting of a subprimal M in accordance with desired physical parameters. Such characteristics of a subprimal to be slabbed are first determined (block 80). Characteristics may include weight, thickness or other dimensions, quality, etc. Pre-existing mathematical (profile) models of various types of subprimals are pre-stored in CPU 12's memory. An operator selects a stored profile model that corresponds to the received subprimal P, e.g., beef top butt, beef sirloin strip, pork loins, pork ham, lamb chops, etc. The profile model includes at least one desired physical parameter, such as slab thickness or weight. CPU 12 then generates a weight-to-length table (block 82) from a length value determined from the measured initial total weight of the subprimal and assumed typical shape for the profile model. The weight-to-length table lists weight (in grams or other units) as a function of length (in millimeters or other units) according to the total weight, the then determined length and the profile model. An initial cut of the subprimal is performed according to the weight-to-length table and the at least one desired physical parameter (block 86).

Also, in the embodiment of FIG. 6, and similar to an aspect of the embodiment of FIG. 2, CPU 12 determines the cut slab weight according to information received from a weight measuring load cell 10 (block 88) or from product characteristics continually determined in block 80. CPU 12 updates the stored weight-to-length table according to the determined cut slab weight information (block 92). CPU 12 then uses the updated weight-to-length table to generate control signals for updating, if necessary, the cutting strategy of the slab cutter 14 (block 86) and if more of the subprimal remains to be cut (block 96). Thus, slab cutter 14 operation is continually optimized throughout the cutting process of the subprimal. This process is repeated until the subprimal is fully cut (block 96). As a result, optimal cutting of the subprimal P is achieved.

In a further aspect of the embodiment of the present invention shown in FIG. 6, additional information on the profile of the subprimal being cut is provided by the slab cross section as ascertained by scanner 18. Scanner 18 scans each cut slab and digitizes the scanned images (block 90). CPU 12 determines the cross section of the cut slab according to the digitized video image by performing image analysis (block 90). The CPU 12 updates the weight-to-length table according to the cross-sectional information, thus generating a more optimum cutting strategy for the slab cutter 14 (block 92).

In an additional embodiment of the present invention, CPU 12 generates an initial fat profile table from the selected profile model (block 84). The fat profile table corresponds to an initial assumption about the proportion of fat to lean of the type of subprimal. The CPU 12 performs a second image analysis of the scanned image (block 90). The second image analysis provides information on the fat content of each cut slab. The CPU 12 updates the fat profile table according to the second image analysis (block 94) and sends additional control signals to the slab cutter 14 according to the updated fat profile table. This process is repeated after each cut again until the subprimal is fully cut (block 96).

Once subprimal M has been fully cut, the above process is repeated for the next subprimal. The information stored relating to the just cut subprimal may be used to update the mathematical model of the particular type of subprimal stored in the CPU's memory. Such information may also be stored in memory to provide a history of the subprimal's that are processed in accordance with the present invention or for other purposes.

Figure 7:
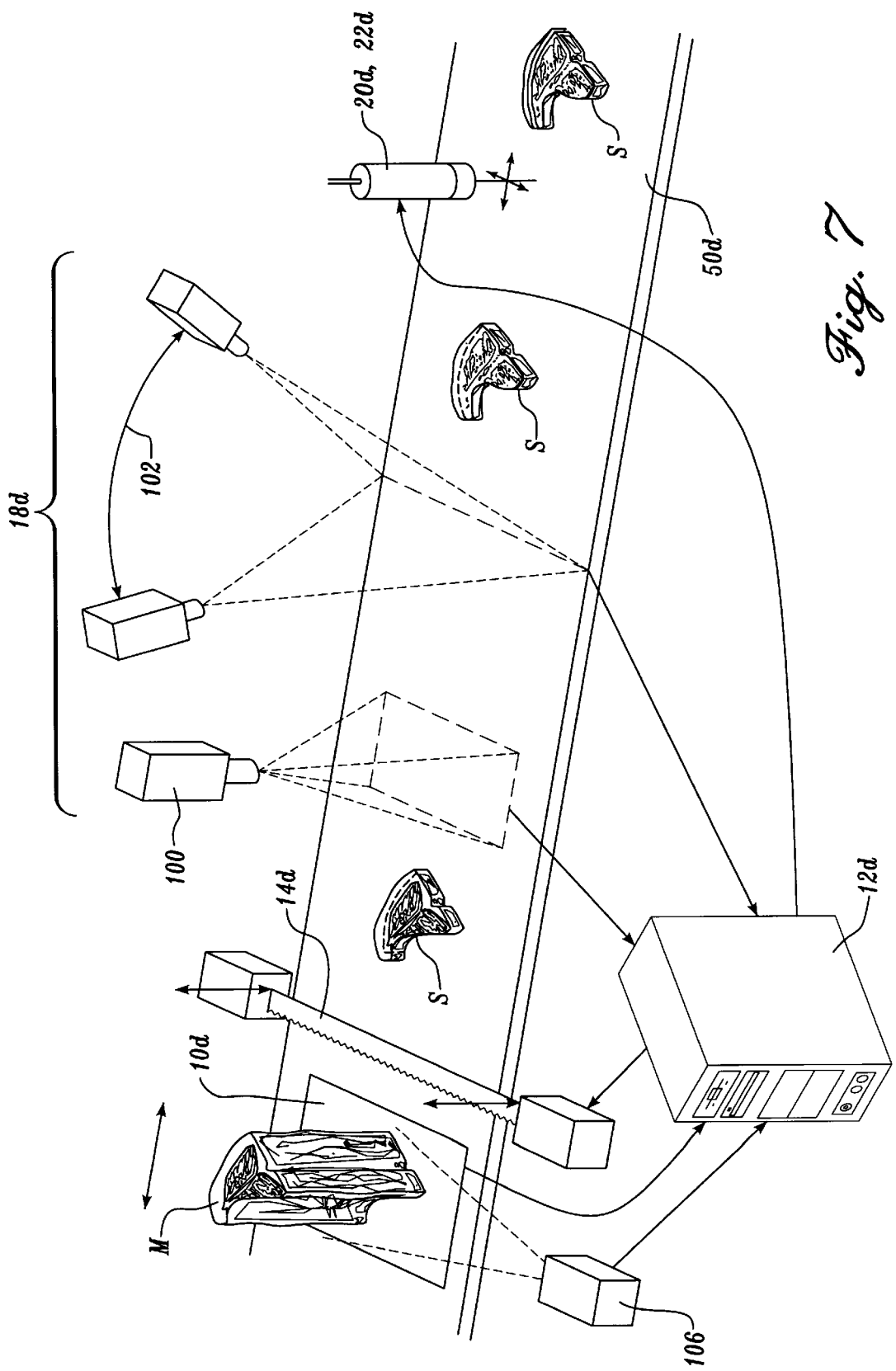
FIG. 7 is a pictorial, schematic view of another meat slabbing apparatus of the present invention.

FIG. 7 illustrates a specific example of the present invention for carrying out the method of FIG. 6. As shown in FIG.

7, slab cutter 14d includes an integral weighing device 10d. The weighing device may be in the form of a load cell or other apparatus. The weighing device 10d weighs the subprimal M prior to each cut performed by slab cutter 14d and sends a signal to CPU 12d. After slab S is cut from subprimal M the slab travels on conveyor 50d to scanner 18d. Scanner 18d includes a high resolution scanner 100 and a multiscopic volume image scanner 102. High resolution scanner 100 generates a high resolution image signal. CPU 12d generates lean-to-fat information according to the high resolution image and updates the fat profile table. The multiscopic volume image scanner 102 provides volume information for updating the weight profile table. Scanner 102 may be composed of two cameras for stereoscopic imaging. However, additional cameras totaling 4, 6, 8, etc. may be utilized to provide a more complete image of the cut slab.

A trimmer 22d is located down stream of scanner 18d. Trimmer 23d generates leaner meat portions as a final product by trimming off excess fat from slab S. Trimmer 15 operates under control signals received from CPU 12d that are generated according to the fat profile table. Trimmer 22d in FIG. 7 performs cutting path assignment according to CPU 12d generated control signals. Trimmer 22d can also be controlled to perform cuts of the slab according to the cutting path assignment from the CPU 12d. The trimming operation performed in trimmer 15 could optionally operate according to markings manually or mechanically placed on the cut slabs by marker 20d or operates according to information from fat determining probes, not shown. Thus, scanner 18d can perform a dual function of optimizing slab cuts and optimizing portioning cuts.

It will be appreciated that for each slab S cut, an image will have been generated by scanner 18d of each side of the slab. This occurs because the image of the top side of the slab S, as shown in FIG. 7, is the same as the bottom side of the next slab to be cut. The CPU 12d can process the images from both faces of the slab and thereby ascertain changes or variations in the slab through the thickness of the slab. For instance, the thickness of the fat at the outer perimeter of the slab may vary from one side of the slab to the other. This information can be utilized by the CPU 12d to control cutter 22d to trim the fat to uniform thickness even though the thickness of the perimeter fat varies through the thickness of the slab. For example, the trimmer 22d can be designed to be tiltable with the angle of tilt being controlled by the control signal operated by the CPU 12d. Alternatively, the cutter 22d may be mounted on a rotating arm, with the angle of the arm being controlled by the output signal from the CPU 12d.

As also illustrated in FIG. 7, a scanner 106 may be utilized to scan the subprimal M prior to each cut performed by the slab cutter 14d. Scanner 106 may be used to ascertain information about the subprimal, including its general shape and the location of the fat layer at the outer surface of the subprimal. This information is transmitted to CPU 12d to assist in developing the initial weight profile table and/or initial fat profile table as well as updating these tables. In addition, instead of a utilizing a single scanner 106 as shown in FIG. 7, multiple scanners can be used. Also, as in scanners 18d, 100 and 102, scanner 106 may be optical or may utilize x-rays or other electromagnetic energy waves.

While preferred embodiments of the invention have been illustrated and described, it will be appreciated that various changes can be made therein without departing from the spirit and scope of the invention. For example, different combinations of output devices (sorters 16, markers 20 and fat trimmers 22) may be utilized with different types of slab cutters 14 shown in FIGS. 3, 4, 5 and 7. Moreover, for manual cutting of the primal M shown in FIG. 5, a visual or audio output signal may be generated by the CPU 12c to indicate to the work person, the desired thickness of the next slab. The work person can locate such thickness on scale 74 thereby to provide a cutting location reference. Further, the signal generated by the CPU 12 for slabbing the primal may operate various types of cutters 14, whether a circular cutter shown in FIG. 3 or the linear cutters shown in FIGS. 4 and 7. In addition, the signal from the CPU 12 may be used to control the location of the cutter 14 or the location of the primal support apparatus, e.g., table 64 in FIG. 4.

The embodiments of the invention in which an exclusive property or privilege is claimed are defined as follows:

1. A method for cutting a plurality of slabs from a meat product in accordance with one or more desired physical parameters, comprising:

(a) cutting a slab from the meat product in accordance with one or more desired physical parameters;

(b) scanning the cut slab after it is cut from the meat product;

(c) determining information from the scan, the information comprising at least one of thickness, fat location, and fat thickness of the cut slab;

(d) cutting a subsequent slab from the same meat product according to the determined information from step (c) on said one or more desired physical parameters; and (e) repeating steps (b) through (d) until cutting of the meat product is complete.

2. The method of claim 1, wherein the cutting of a subsequent slab according to the determined information comprises adjusting the position of the meat product relative to a cutting blade.

3. The method of claim 1, wherein the desired physical parameters are selected from a group consisting of desired thickness, desired weight, desired fat thickness and desired fat content of a cut slab.

4. The method of claim 1, wherein the cut slab is scanned by a technique selected from the group consisting of optical scanning, video scanning and x-ray scanning.

5. The method of claim 1, wherein the step of scanning the cut slab includes generating an image of the cut slab.

6. The method of claim 1, wherein the step of information further comprises:

determining the weight of the meat product to be cut; and generating a weight-to-length table in accordance with the determined weight of the product and a predetermined length value that corresponds to the weight and the type of meat product.

7. The method of claim 6, wherein the step of determining information further comprises updating the weight-to-length table in accordance with the generated cross-sectional image of the slab previously cut.

8. The method of claim 7, further comprising:

generating a fat profile table generated according to a predetermined fat proportion value that corresponds to the type of meat product;

generating fat content of the cut slab; and updating the fat profile table in accordance with said generated fat content.

9. The method of claim 8, wherein the fat content of the cut slab is generated from information determined from the scanning step.

10. The method of claim 1, further comprising selecting the type of meat product.

11. The method of claim 1, comprising carrying out at least one further step according to determined information, the at least one further step selected from the group consisting of trimming the slab, cutting the slab, marking the slab for subsequent trimming, marking the slab for subsequent cutting and sorting the slab in accordance with desired criteria.

12. The method of claim 1, wherein said determining information further comprises generating at least one of a video or audio signal.

13. The method of claim 12, wherein the at least one video or audio signal corresponds to adjusting the cutting according to the determined information.

14. The method of claim 1, wherein both faces of the cut slab are scanned and information is determined from both of said scans.

15. The method of claim 14, wherein the information determined from the two scans includes changes in the composition of the cut slab in the direction through the thickness of the cut slab.

16. A method for cutting slabs from a meat product in accordance with one or more desired physical parameters, comprising:
 (a) weighing the meat product to be cut;
 (b) generating a weight-to-length table in accordance with the weight of the product and a predetermined length value that corresponds to the weight and the type of meat product;
 (c) cutting a slab from the meat product in accordance with the weight-to-length table and the one or more desired physical parameters;
 (d) determining the weight of the cut slab;
 (e) updating the weight-to-length table in accordance with the measured slab weight; and
 (f) repeating (c) through (e) until cutting of the meat product is complete.

17. The method of claim 16, wherein the desired physical parameters are selected from the group consisting of desired thickness, desired weight, desired fat content and desired fat thickness of the cut slab.

18. The method of claim 16, further comprising selecting the type of meat product.

19. The method according to claim 16, wherein the weight of the cut slab is determined by comparing the weight of the meat product before and after the slab has been cut.

20. The method of claim 16, further comprising the scanning the cut slab, determining information from the scan and utilizing such determined information in cutting a subsequent slab from the meat product.

21. The method of claim 20, wherein the determined information is used to update the weight-to-length table.

22. The method of claim 20, wherein the cross section scan of the cut slab is performed by a video camera.

23. The method of claim 21, wherein the cross-section scan of the cut slab is performed by electromagnetic energy wave imaging.

24. The method of claim 20:
 (a) further comprising generating a fat profile table in accordance with a predetermined fat proportion value that corresponds to the type of meat product;
 (b) wherein the step of cutting the slab further comprises cutting the meat product in further accordance with the fat profile table;
 (c) further comprising determining the fat content from the scanned cross section of the cut slab; and
 (d) further comprising updating the fat profile table according to the determined fat content of the cut slab.

25. The method of claim 24 wherein the scanning of the cut slab is performed by a video camera.

26. The method of claim 24, wherein the scanning of the cut slab is performed by electromagnetic energy wave imaging techniques.

27. The method of claim 16, further comprising:
 (a) determining the fat content of the cut slab; and
 (b) cutting the meat product in further accordance with the determined fat content.

28. The method of claim 27, further comprising:
 (a) generating a fat profile table in accordance with a predetermined fat proportion value that corresponds to the type of meat product;
 (b) cutting the meat product in further accordance with the fat profile table;
 (c) determining the fat content of the cut slab; and
 (d) updating the fat profile table according to determined fat content of the cut slab.

29. The method of claim 27, wherein determining the fat content is performed by a video camera.

30. The method of claim 27, wherein determining the fat content is performed by electromagnetic energy wave imaging.

31. A system for cutting slabs from a meat product, comprising:
 a cutting device for cutting a plurality of slabs from the meat product;
 a scanner for generating an image of each of the cut slabs after it is cut from the meat product;
 a processor for determining information from said generated image, the information comprising at least one of thickness, fat location, and fat thickness of the cut slab; and
 a control device for controlling the cutting device for subsequent cuts or controlling a device acting on the cut slabs according to said determined information.

32. The system of claim 31, wherein the control device controlling the cutting comprises a means for adjusting the position of the meat product relative to the cutting device.

33. The system of claim 32, wherein the cutting device includes a cutting blade and a meat product holder, and the control device moving one of the cutting blade and meat product holder.

34. The system according to claim 31, wherein the device acting on the cut slabs are selected from a group consisting of a marking device for marking the path along which the cut slab is to be trimmed, a trimming device for trimming the cut slab and a sorting device for sorting cut slabs in accordance with desired parameters.

35. The system according to claim 31, wherein the control device for controlling the cutting device is selected from a group consisting of: a device for positioning the meat product and cutting device relative to each other, a visual display capable of displaying visual indicia corresponding to the desired thickness of the next slab to be cut; and, an audio signal generator capable of generating an audio signal corresponding to the desired thickness of the next slab to be cut.

36. The system of claim 31, wherein the desired physical parameters are selected from the group consisting of the desired thickness, the desired weight, the desired fat content, the desired fat location and the desired fat thickness of a cut slab.

37. The system of claim 31, wherein:
 said scanner further comprises a means for generating a cross-sectional image of the cut slab; and said processor further comprises means for determining the thickness and weight of said cut slab.

38. The system of claim 31, wherein:
the scanner is capable of generating a high resolution image of the cut slabs; and,
the processor is capable of determining the cut slab's proportion of fat to lean.

39. The system of claim 31, wherein the processor further comprises:
determining the weight of the meat product to be cut; and
generating a weight-to-length table in accordance with the determined weight of the meat product and a predetermined length value that corresponds to the weight and the type of meat product.

40. The system of claim 39, wherein the processor is capable of updating the weight-to-length table in accordance with the weight of the slab previously cut.

41. The system of claim 39 wherein the processor is capable of updating the weight-to-length table in accordance with the generated cross-sectional image of the slab previously cut.

42. The system of claim 41, wherein the processor is capable of:
generating a fat profile table generated according to a predetermined fat proportion value that corresponds to the type of meat product; and
generating the fat content for the cut slab.

43. The system of claim 42, wherein the fat content of the cut slab is generated in accordance with the generated image of the cut slab.

44. The system of claim 43, wherein the generated images are generated by a video camera.

45. The system of claim 31, further comprising an interface device for selecting the type of meat product.

46. The system of claim 31, wherein the processor is capable of generating at least one of a video or audio signal corresponding to the thickness of the next slab to be cut from the meat product.

47. A system for cutting slabs from a meat product comprising:
a measuring device for measuring the weight of the meat product to be cut;
a control system for generating a weight-to-length table in accordance with the determined weight of the meat product and a predetermined length that corresponds to the weight and type of the meat product;
a cutting device for cutting slabs from the meat product;
a control device for controlling the cutting device according to the generated weight-to-length table; and
wherein the control system further includes means for updating the weight-to-length table in accordance with the weight of the slab previously cut.

48. The system of claim 47, further comprising:
a subsystem for generating the fat content of the cut slab; and
the control device also controlling the cutting based on the fat content of the cub slab.

49. The system according to claim 48, wherein the subsystem for generating the fat content of the cut slab initially generates a fat profile table according to a predetermined fat proportion value that corresponds to the type of meat product, with the fat profile table being updated with the fat content of the cut slab.

50. The system according to claim 48, wherein the fat content of the cut slab is determined from a generated image of the cut slab.

51. The system according to claim 50, wherein the image of the cut slab is generated by a video camera.

52. The system according to claim 51, wherein the image of the cut slab is generated by use of electromagnetic energy waves directed at the cut slab.

53. The system according to claim 47, further comprising a trimmer for trimming the cut slab according to predetermined criteria.

54. The system according to claim 47, further comprising a sorter for sorting the cut slabs in accordance with predetermined criteria.

55. The system according to claim 47, further comprising a marker for automatically marking according to the generated weight-to-length table a trimming path to be followed when trimming the cuts slab.

56. The system according to claim 47:
further comprising a scanner for scanning the cut slab; and,
the control system determining physical features of the cut slab according to information received from the scanner.

57. The system according to claim 56, wherein one of the features determined by the scanner and control systems includes the weight of the cut slab.

58. The system according to claim 56, wherein the features determined by the scanner and control system include the fat content of the cut slab.

59. The system according to claim 58, wherein the fat content features determined by the scanner and control system include the location of the fat and the thickness of the fat on the scanned slab.

60. A method for cutting slabs from a meat product in accordance with one or more desired physical parameters, comprising:
(a) generating a fat profile table according to a predetermined fat proportion value that corresponds to the type of meat product;
(b) cutting a slab from the meat product in accordance with the fat profile table and the one or more desired physical parameters;
(c) scanning the cut slab;
(d) determining information from the scan;
(e) adjusting the cutting according to the determined information on the one or more desired physical parameters; and
(f) repeating steps (a) through (e) until cutting of the meat product is complete.

61. The method of claim 60, wherein the desired physical parameters are selected from a group consisting of desired thickness, desired weight, desired fat thickness, and desired fat content of a cut slab.

62. The method of claim 60, wherein the step of scanning the cut slab includes generating an image of the cut slab.

63. The method of claim 62, wherein:
the step of generating an image further comprises generating a cross-sectional image; and
the step of determining information further comprises determining at least one of thickness, weight, fat thickness, fat content, and fat location of the cut slab.

64. The method of claim 60, further comprising updating the fat profile table in accordance with the information determined from the scanning step.

65. The method of claim 60, further comprising carrying out at least one further step according to the determined information, the at least one further step selected from the group consisting of trimming the slab, cutting the slab, marking the slab for subsequent trimming, marking the slab for subsequent cutting, and sorting the slab in accordance with desired criteria.

66. The method of claim 60, wherein both faces of the cut slab are scanned and information is determined from both of the scans.

67. The method of claim 66, wherein the information determined from the two scans includes changes in the composition of the cut slab in the direction through the thickness of the cut slab.

68. A system for cutting slabs from a meat product in accordance with one or more desired physical parameters, comprising:

a cutting device for cutting slabs from the meat product;

a scanner for generating an image of the cut slabs;

a processor generating a fat profile table according to a predetermined fat proportion value that corresponds to the type of meat product, the processor further determining information from the generated image; and a control device for controlling the cutting device or controlling a device acting on the cut slabs according to the determined information.

69. The system according to claim 68, wherein the device acting on the cut slabs is selected from a group consisting of a marking device for marking the path along which the cut slab is to be trimmed, a trimming device for trimming the cut slab, and a sorting device for sorting cut slabs in accordance with desired parameters.

70. The system according to claim 68, wherein the control device for controlling the cutting device is selected from a group consisting of: a device for positioning the meat product and cutting device relative to each other; a visual display capable of displaying visual indicia corresponding to the desired thickness of the next slab to be cut; and, an audio signal generator capable of generating an audio signal corresponding to the desired thickness of the next slab to be cut.

71. The system of claim 68, wherein the desired physical parameters are selected from the group consisting of the desired thickness, the desired weight, the desired fat content, and the desired fat thickness of a cut slab.

72. The system of claim 68, wherein the processor further comprises means for determining at least one of thickness, weight, fat content, fat location, and fat thickness of the cut slab.

73. The system of claim 68, further comprising an interface device for selecting the type of meat product.

74. The system of claim 68, wherein the processor is capable of generating at least one of a video or audio signal corresponding to the thickness of the next slab to be cut from the meat product.

* * * * *

UNITED STATES PATENT AND TRADEMARK OFFICE
CERTIFICATE OF CORRECTION

PATENT NO. : 5,937,080
DATED : August 10, 1999
INVENTOR(S) : A.W. Vogeley, Jr. et al.

It is certified that error appears in the above-identified patent and that said Letters Patent is hereby corrected as shown below:

| COLUMN | LINE | |
|---|---|---|
| 4 | 6 | "appreciated to" --appreciated by-- |
| 4 | 41 | "are to cut" --are to be cut-- |
| 4 | 42 | "its" should read --their-- |
| 5 | 4 | "pass" should read --past-- |
| 5 | 5 | "pass" should read --past-- |
| 5 | 20 | "lob" should read --10b-- |
| 5 | 35 | "passed" should read --past-- |
| 5 | 57 | after "slab S" insert --is-- |
| 6 | 6 | "subprimal P," should read -subprimal M,-- |
| 6 | 34 | "subprimal P" should read -subprimal M-- |
| 6 | 63 | "subprimal's" should read --subprimals-- |
| 7 | 28 | "operates" should read --operate-- |
| 8 | 4 | after "person" delete "," |
| 8 | 5 | after "74" insert --,-- |
| 9 (Claim 20, line 1) | 46 | after "comprising" delete "the" |

UNITED STATES PATENT AND TRADEMARK OFFICE
CERTIFICATE OF CORRECTION

PATENT NO.  : 5,937,080
DATED       : August 10, 1999
INVENTOR(S) : A.W. Vogeley, Jr. et al.

It is certified that error appears in the above-identified patent and that said Letters Patent is hereby corrected as shown below:

| COLUMN | LINE | |
|---|---|---|
| 10 (Claim 34, | line 2) | "are selected" should read --is selected-- |
| 10 (Claim 35, | line 4) | after "other" delete "," and insert therefor --;-- |
| 11 (Claim 41, | line 1) | after "claim 39" insert --,-- |
| 11 (Claim 48, | line 5) | "cub" should read --cut-- |
| 12 (Claim 55, | line 4) | "cuts" should read --cut-- |

Signed and Sealed this

Eighth Day of August, 2000

Attest:

Q. TODD DICKINSON

*Attesting Officer*          *Director of Patents and Trademarks*